US007092674B2

(12) United States Patent
Pan

(10) Patent No.: US 7,092,674 B2
(45) Date of Patent: Aug. 15, 2006

(54) MULTI-MODE BAND-GAP CURRENT REFERENCE

(75) Inventor: Meng-An (Michael) Pan, Cerritos, CA (US)

(73) Assignee: Broadcom Corporation, Irvine, CA (US)

( * ) Notice: Subject to any disclaimer, the term of this patent is extended or adjusted under 35 U.S.C. 154(b) by 601 days.

(21) Appl. No.: 10/460,578

(22) Filed: Jun. 12, 2003

(65) Prior Publication Data

US 2004/0253930 A1 Dec. 16, 2004

(51) Int. Cl.
*H04B 1/38* (2006.01)

(52) U.S. Cl. .................. 455/73; 455/127.1; 455/343.1; 455/550.1; 455/572; 323/313; 323/314; 327/539; 327/542; 327/543

(58) Field of Classification Search ................. 455/73, 455/127.1, 343.1, 550.1, 572; 323/313, 314; 327/539, 542, 543
See application file for complete search history.

(56) References Cited

U.S. PATENT DOCUMENTS 6,853,238 B1 * 2/2005 Dempsey et al. ........... 327/539
2004/0198290 A1 * 10/2004 Chien ......................... 455/260
2005/0186917 A1 * 8/2005 Rofougaran et al. .......... 455/73

* cited by examiner

*Primary Examiner*—Nay Maung
*Assistant Examiner*—Tuan H. Nguyen
(74) *Attorney, Agent, or Firm*—Garlick Harrrison & Markison; Timothy W. Markison

(57) ABSTRACT

A multi-mode band-gap current reference includes a band-gap current mode module and an adjustable current source module. The band-gap current module provides a band-gap reference current and a voltage representation of the band-gap reference current. The adjustable current source module is operably coupled to produce a process-independent band-gap current and a voltage representation of the process-independent band-gap current. The adjustable current source module produces the process-independent band-gap current based on a difference between the voltage representation of the band-gap reference current and the voltage representation of the process-independent band-gap current.

11 Claims, 7 Drawing Sheets bandgap current reference 77 bandgap current reference 77 adjustable current source module 102 adjustable current source module 102 bandgap current reference 77

MULTI-MODE BAND-GAP CURRENT REFERENCE

BACKGROUND OF THE INVENTION

1. Technical Field of the Invention

This invention relates generally to integrated circuits and more particularly to band-gap references.

2. Description of Related Art

Integrated circuits are used in an abundance of electronic devices ranging, for example, from handheld games to computers to communication systems to home appliances and beyond. Integrated circuits can be manufactured using a variety of processes including bipolar, CMOS, gallium arsenide, and silicon germanium. Of these processes, CMOS is the most popular due to its flexibility to support various circuit topologies, its circuit density (i.e., amount of transistors per die area), and its cost. CMOS integrated circuits, however, are not perfect. For instance, the performance of the components fabricated utilizing a CMOS process varies over temperature and also varies from integrated circuit to integrated circuit. Multiple techniques have been developed to compensate for these variations including match component designs, band-gap references, calibration circuits, et cetera.

Band-gap voltage references are used on almost every integrated circuit to provide a fixed reference voltage that does not drift over temperature and may be designed to be process variant independent or process variant dependent. Typically, a band-gap circuit is designed to provide a 1.2 volt reference that does not vary over temperature. This is typically done by taking advantage of the known temperature related properties of CMOS transistors. As is known, a base emitter voltage ($V_{BE}$) of a CMOS transistor that is emulating a bipolar transistor decreases over temperature. As is further known, the slope of the $V_{BE}$ versus temperature curve varies based on the size of the transistor, where a smaller transistor has a greater slope than a larger transistor. Based on this property, a positive slope difference ratio may be produced over temperature between the two transistors of different sizes. This difference ratio may be scaled to have an equal but opposite slope of the $V_{BE}$ versus temperature curve for the smaller transistor. Utilizing these inversely proportional curves, a temperature independent band-gap voltage reference is achieved.

The band-gap voltage reference can be resistor-independent or resistor-dependent. The resistor-dependent band-gap voltage reference is one that produces a voltage that, from integrated circuit to integrated circuit varies due to process variations inherent in the CMOS integrated circuit fabrication process of producing resistors. Circuits whose operations are resistor-dependent use resistor-dependent band-gap voltage references. For example, an amplifier with resistive loads is a circuit whose operation is resistor-dependent. In particular, the process variations of the resistive load (i.e., the resistor value, for integrated circuit to integrated circuit varies) affect the gain of the amplifier. By utilizing a resistor-dependent band-gap voltage reference for such circuits, the process variations that affect the circuit also affect the band-gap voltage reference in a similar manner such that, from integrated circuit to integrated circuit, the circuit performs in a substantially similar manner.

A resistor-independent band-gap voltage reference is one that, from integrated circuit to integrated circuit, produces a substantially similar voltage reference. Circuits whose performance are not affected by process variations in fabricating resistors, but are dependent on an accurate voltage reference use resistor-independent band-gap voltage references. For example, analog-to-digital converters, digital-to-analog converters and other digital circuits are circuits that use a resistor independent bandgap voltage reference.

Many integrated circuits include circuits whose performance is resistor-dependent and circuits whose performance is resistor-independent. To accommodate both types of circuits, the integrated circuit includes two band-gap references: one that is resistor-dependent and one that is resistor-independent.

A band-gap voltage reference, whether resistor-independent or resistor-dependent, includes at least three stacked transistors per leg, which requires a supply voltage of at least 2.1 volts. Such a restriction presents a significant problem as the CMOS process evolves to allow integrated circuits to be powered from voltage sources of 1.8 volts and below. For these low supply voltage CMOS integrated circuits, the band-gap reference will not operate properly thus will not provide a reliable band-gap voltage reference.

Therefore, a need exists for a low supply voltage band-gap reference that can be extended to supply both a resistor-dependent band-gap reference and a resistor-independent band-gap reference.

BRIEF SUMMARY OF THE INVENTION

The multi-mode band-gap current reference of the present invention substantially meets these needs and others. In one embodiment, a multi-mode band-gap current reference includes a band-gap current mode module and an adjustable current source module. The band-gap current module provides a band-gap reference current and a voltage representation of the band-gap reference current. The adjustable current source module is operably coupled to produce a process-independent band-gap current and a voltage representation of the process-independent band-gap current. The adjustable current source module produces the process-independent band-gap current based on a difference between the voltage representation of the band-gap reference current and the voltage representation of the process-independent band-gap current. The multi-mode band-gap current reference may be further expanded to include a process-dependent current source module that produces a process-dependent band-gap current based on the band-gap current reference. As such, with a single band-gap reference, multiple band-gap current sources may be produced where one of the band-gap current sources is process-independent and one of the band-gap current references is process-dependent.

In another embodiment, a multi-mode band-gap current reference includes means for generating a band-gap reference current, means for generating a voltage representation of the band-gap reference current, means for producing a process-independent band-gap current based on the voltage representation of the band-gap reference current and a voltage representation of the process-independent band-gap current, means for generating a voltage representation of the process-independent band-gap current, and means for generating a process-dependent band-gap current based on the band-gap reference current. Such a multi-mode band-gap current reference is a single circuit that produces multiple band-gap current references, one being process-independent and the other being process-dependent.

DETAILED DESCRIPTION OF THE INVENTION

Figure 1:
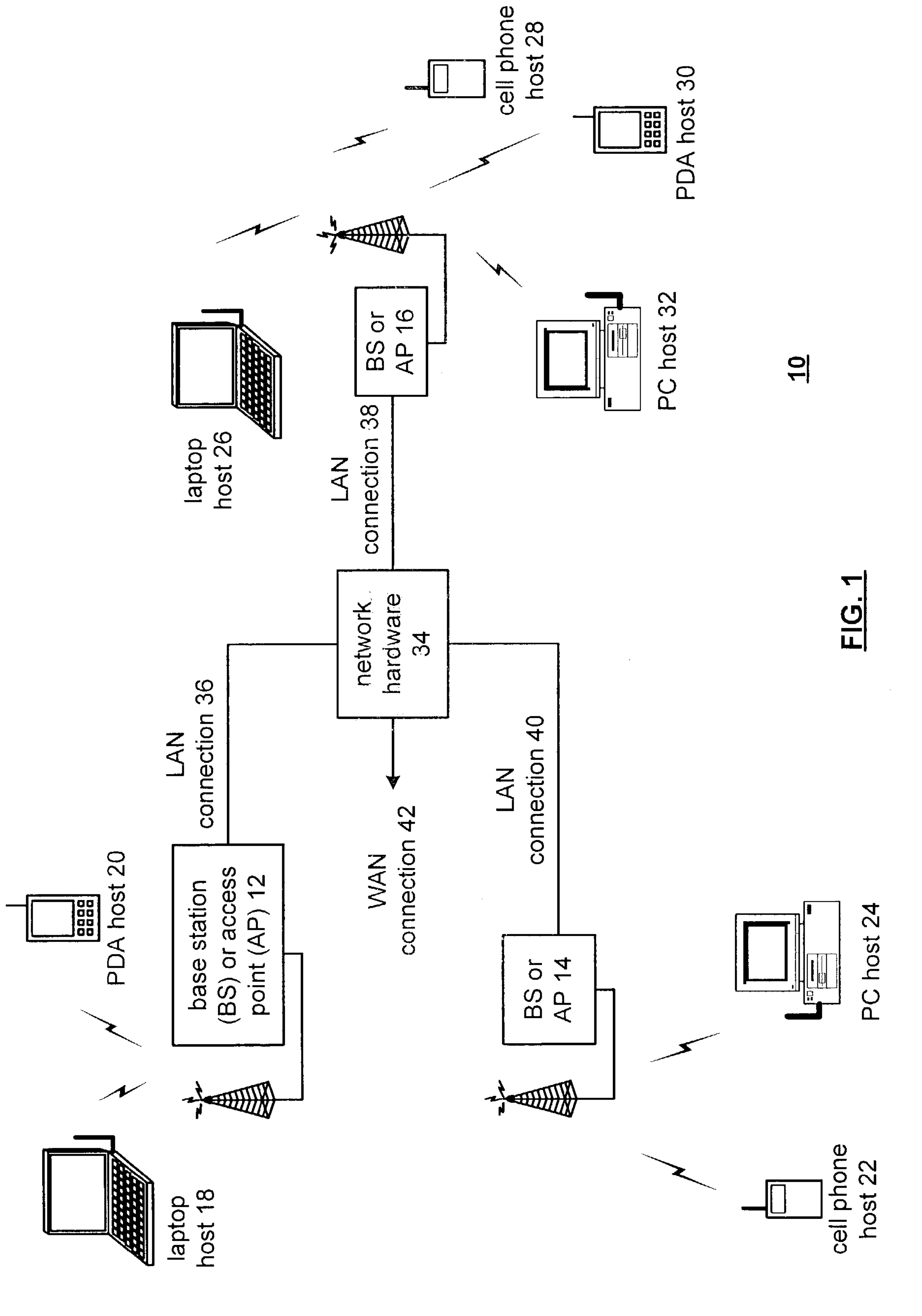
FIG. 1 is a schematic block diagram of a wireless communication system in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
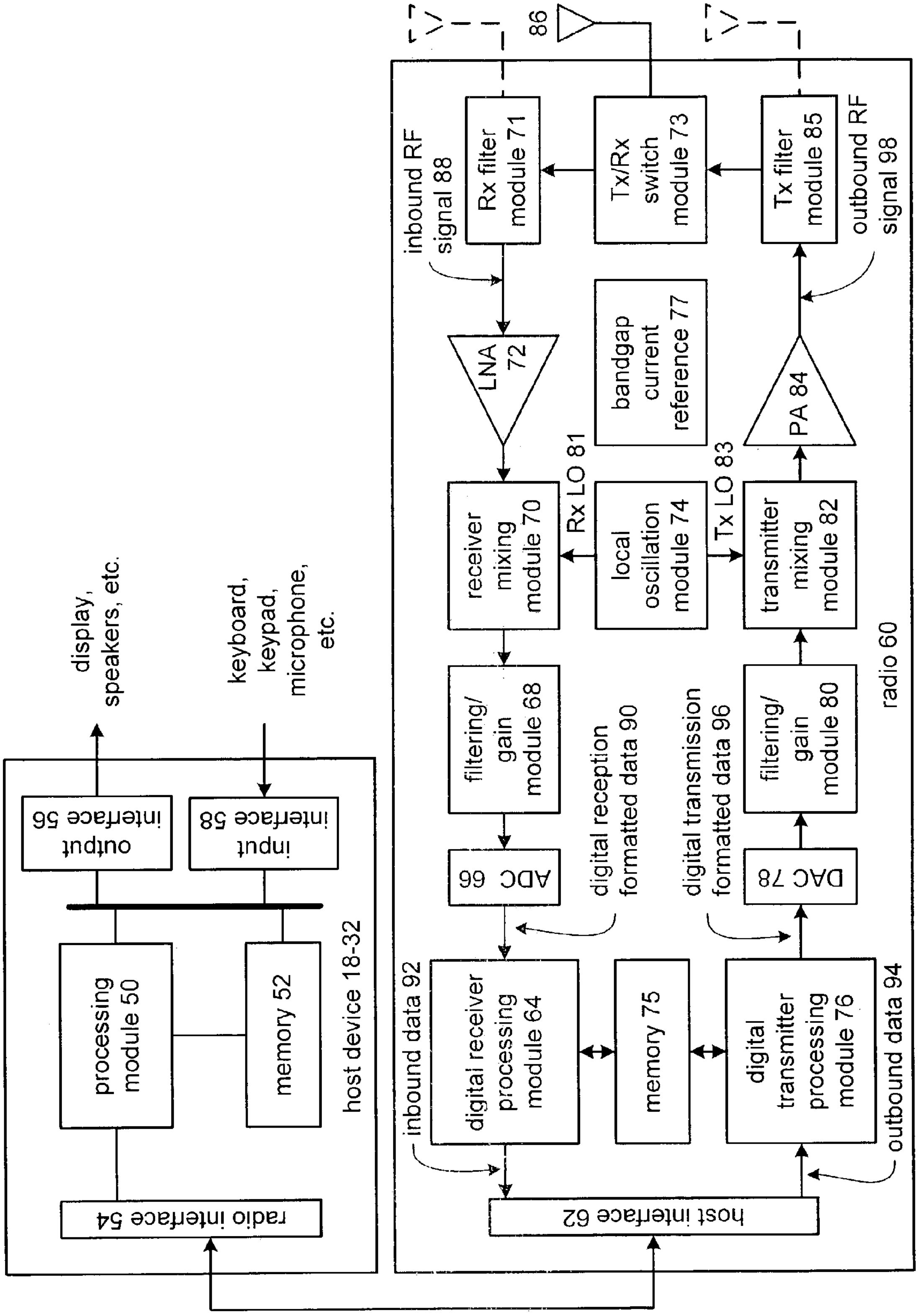
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a bandgap current reference 77, a digital-to-analog converter 78, a filtering/gain module 80, an IF mixing Up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

The bandgap current reference 77, which may be implemented in accordance with the teachings of the present invention, provide a bandgap current reference to one or more of the LNA 72, the receiver mixing module 70, the filter/gain module 68, the ADC 66, the local oscillation module 74, the DAC 78, the filter/gain module 80, the transmitter mixing module 82, and the power amplifier 84.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
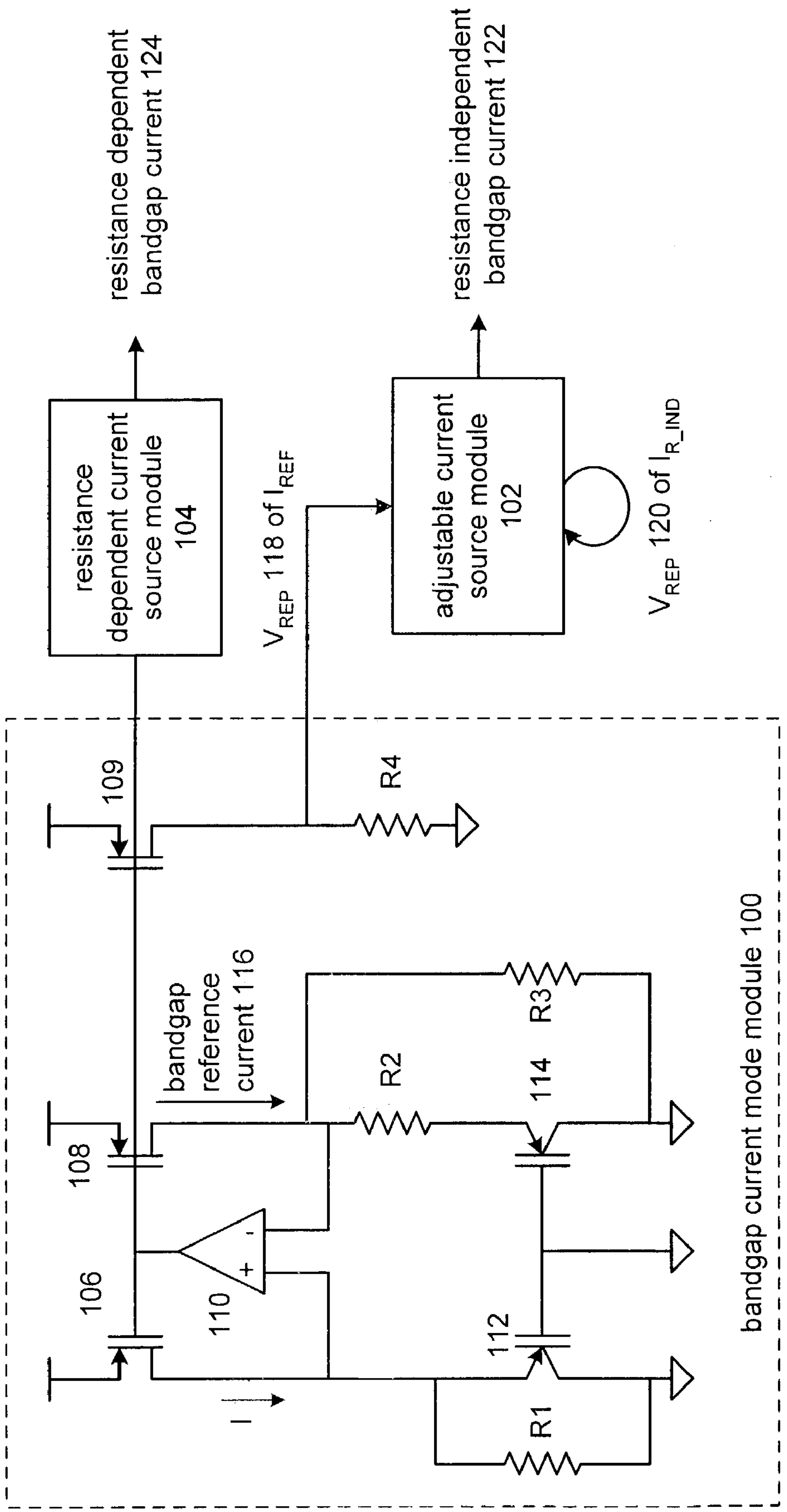
FIG. 3 is a schematic block diagram of a band-gap current reference in accordance with the present invention.

FIG. 3 is a schematic block diagram of a band-gap current reference 77 that includes a band-gap current mode module 100, a process-dependent current source module 104, and an adjustable current source module 102. The band-gap current source module 100 includes bipolar transistors 112 and 114 (or field effect transistors configured to provide a bipolar base emitter voltage), a plurality of resistors R1–R4, an operational amplifier 110 and current source transistors 106, 108 and 109. Note that transistor 114 is larger than transistor 112 such that its base emitter voltage versus temperature curve has less of a slope than the corresponding curve for transistor 112. The operational amplifier 110 compares the base emitter voltage of 112 with the difference voltage produced by the current flowing through resistor R2, which corresponds to $V_{BE}$ 112–$V_{BE}$ 114. The operational amplifier 110 produces a gate voltage that regulates the current produced by transistors 106 and 108. The current produced by transistor 108 corresponds to the band-gap reference current 116. Transistor 109 mirrors the band-gap reference current 116 and, via resistor R4, generates a voltage representation 118 of the reference current 116. For a further description of the band-gap current mode module 100, refer to co-pending patent application entitled LOW POWER SUPPLY BAND-GAP CURRENT REFERENCE, having an attorney docket number of BP 2873 and a filing date the same as the present application, which is hereby incorporated by reference.

The band-gap current mode module 100 outputs a representation of the band-gap reference current 116 to the process-dependent current source module 104 and/or the voltage representation 118 of the band-gap reference current to the adjustable current source module 102. The process-dependent current source module 104 produces a process-dependent band-gap current 124. The adjustable current source module 102 generates a voltage representation 120 of the process-independent current 122 and, based on the difference of this voltage representation 120 and the voltage representation 118 of the reference band-gap current, the adjustable current source module 102 produces the process-independent band-gap current 122.

In this embodiment, the resistors R1–R4 within the band-gap current mode module 100 are process variant devices within the band-gap reference circuit 77. Accordingly, the process-dependent band-gap current 124 may be readily utilized by circuits that include a resistive element that affects its performance, such as amplifiers that have resistors as current-to-voltage output elements. As such, the process variances of the resistors within the amplifier substantially match the process variations within the resistors of the band-gap current mode module 100 thus producing, from integrated circuit to integrated circuit, a consistent operation for the corresponding circuit.

The adjustable current source module 102 produces a process-independent band-gap current 122, which may be utilized by circuits that require a consistent band-gap reference from integrated circuit to integrated circuit. Such circuits include digital-to-analog converters, analog-to-digital converters and any other type of circuit that requires a consistent band-gap reference and does not include resistors that affect its overall performance.

Figure 4:
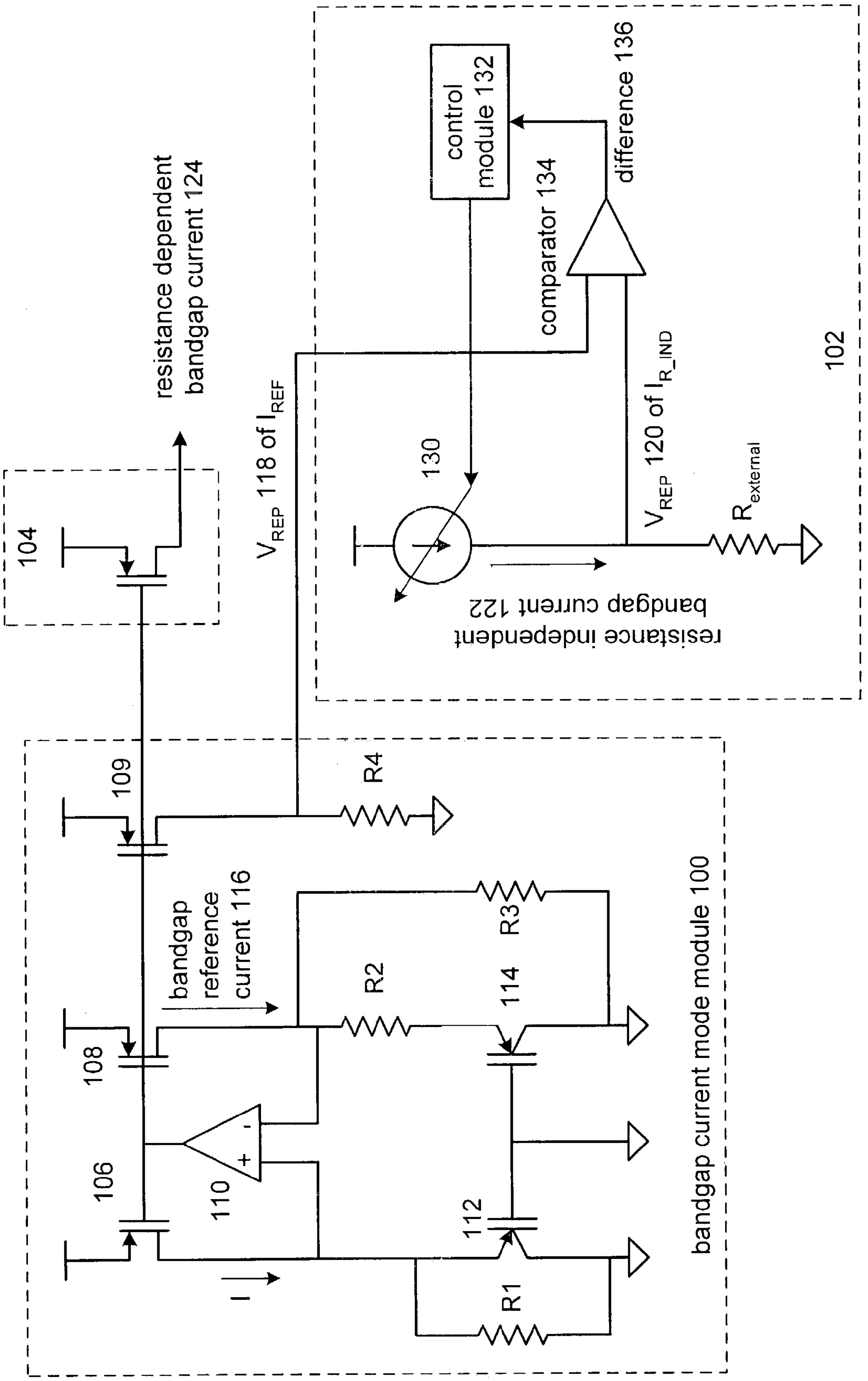
FIG. 4 is a schematic block diagram of an alternate embodiment of a band-gap current reference in accordance with the present invention.

FIG. 4 is a schematic block diagram of an alternate embodiment of a band-gap current reference circuit 77. The band-gap current reference 77 includes the band-gap current mode module 100, the process-dependent source 104 and the process-independent source 102. In this embodiment, the process-dependent source includes a P-channel transistor that may be matched to the P-channel transistors 106, 108 and/or 109 or a scaled representation thereof to produce the process-dependent band-gap current 124.

The adjustable current source module 102 includes an adjustable current source 130, a resistor $R_{external}$, a comparator 134 and a control module 132. The resistor $R_{external}$ is off-chip and thus does not vary from process-to-process as do resistors R1–R4. The current source 130 generates the process-independent band-gap current 122 and the voltage imposed across resistor $R_{external}$ generates the voltage representation 120 of the process-independent current. The comparator 134 compares the voltage representation 118 of the band-gap current reference with the voltage representation 120 of the process-independent current to produce a difference signal 136. Ideally, the difference signal 136 should be zero such that the voltage representation 118 of the band-gap reference current 116 substantially matches the voltage representation 120 of the process-independent current 122. To achieve this, the current module 132 adjusts the current source 130 to subsequently adjust the process-independent band-gap current 122. As such, the resulting process-independent band-gap current 122, via the control loop that includes comparator 134 and control module 132, filters out the processed variations thereby producing the process-independent band-gap reference current 122.

Figure 5:
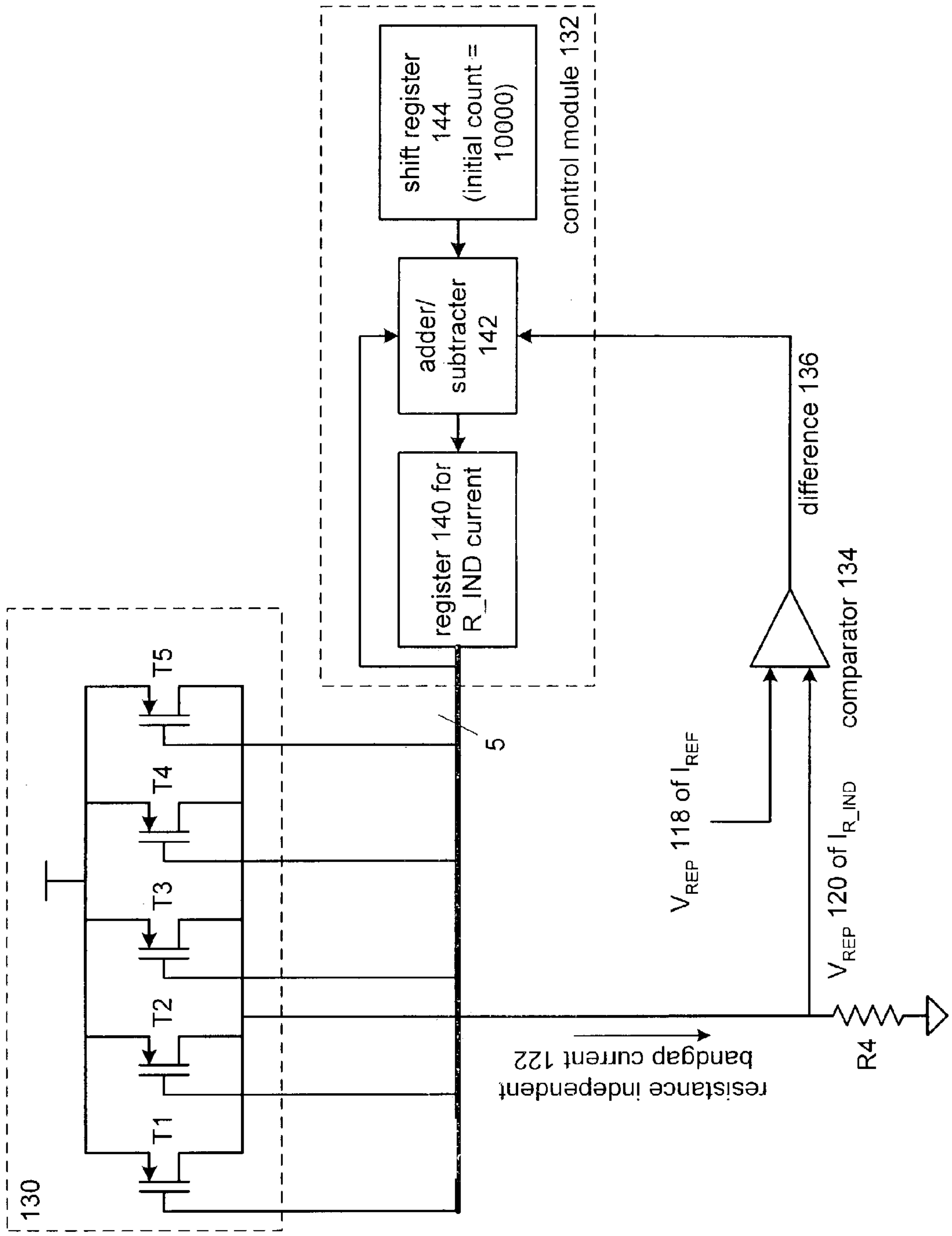
FIG. 5 is a schematic block diagram of an adjustable current source module as may be used in either of the embodiments of the band-gap current reference of FIGS. 3 and 4.

FIG. 5 illustrates a schematic block diagram of the adjustable current source module 102 that may be used in the band-gap references of FIG. 3 or 4. In this embodiment, the adjustable current source module 130 includes a plurality of transistors T1-T5 and the control module 132 includes a register 140, an adder/subtractor module 142 and a shift register 144. The transistors T1–T5 of the adjustable current source module 130 are scaled to produce different levels of current when activated. As shown, register 140 outputs a 5-bit signal that drives the gates of T1–T5. The combination of transistors T1–T5 produces the corresponding process-independent band-gap current 122.

The comparator 134, as previously discussed with reference to FIG. 4, generates the difference signal 136. The adder/subtractor 142 receives the difference signal 136 and, via an initial count value received by the shift register adjusts the value stored in register 140. As the value and register 140 is adjusted, based on the difference signal 136, the combination of transistors that is enabled and disabled is changed to produce the desired process-independent band-gap current reference 122.

Figure 6:
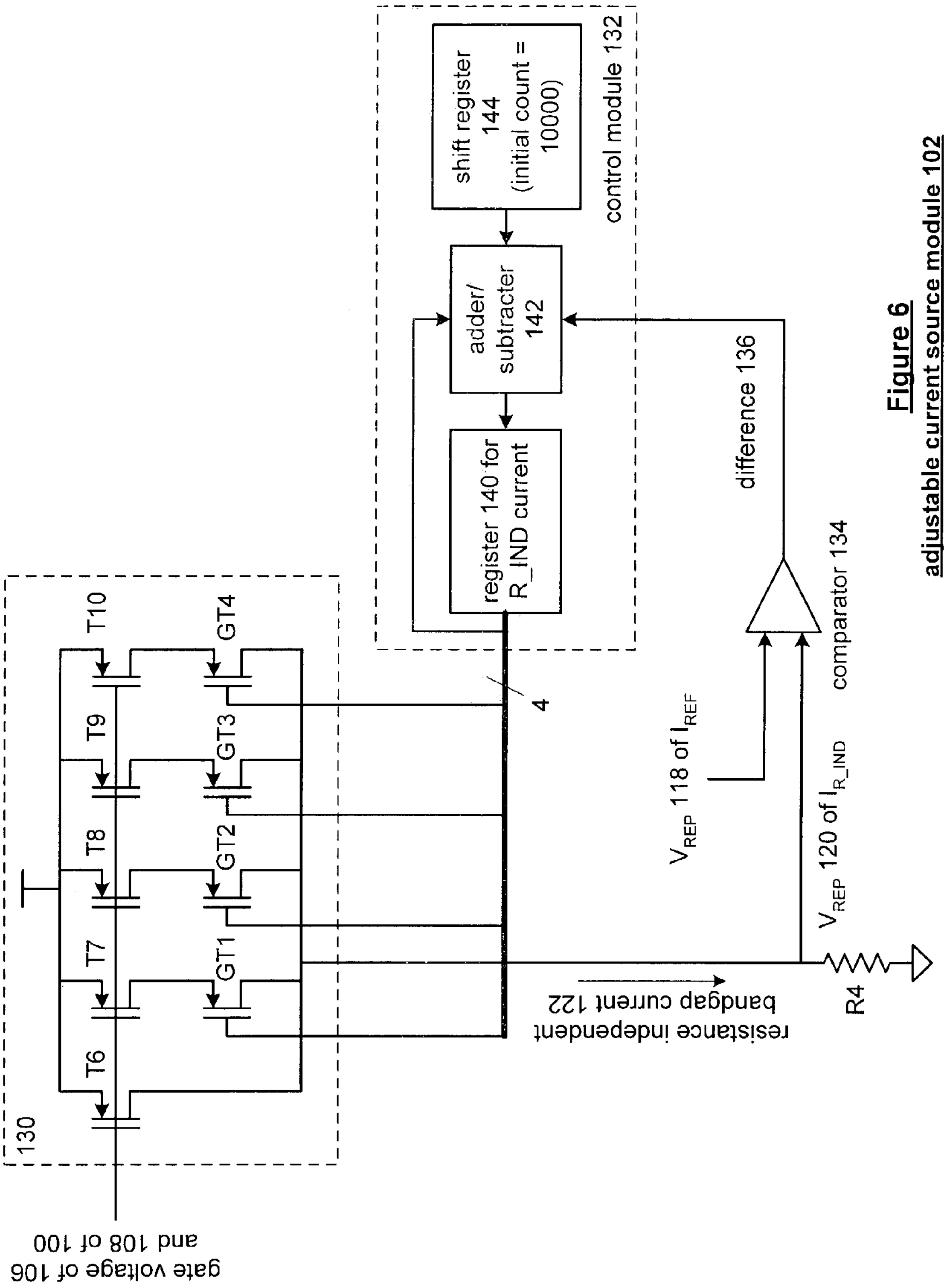
FIG. 6 illustrates an alternate schematic block diagram of an adjustable current source module that may be used in the band-gap current references of FIG. 3 or 4.

FIG. 6 illustrates an alternate schematic block diagram of adjustable current source module 102. In this embodiment, the adjustable current source 130 includes a plurality of transistors T6–T10 and a plurality of gate transistors GT1–GT4. The plurality of transistors T6–T10 has their gates commonly coupled to the gate voltage of transistor 106 or 108 of the band-gap current mode module 100. The transistors T6–T10 are scaled to provide a range of currents over a various combinations of enablement thereof. The gate transistors GT1–GT4 are enabled based on the 4-bit value produced by control module 132. The resulting combination of enablement of gates T6–T10 produces the corresponding process-independent band-gap current 122.

Figure 7:
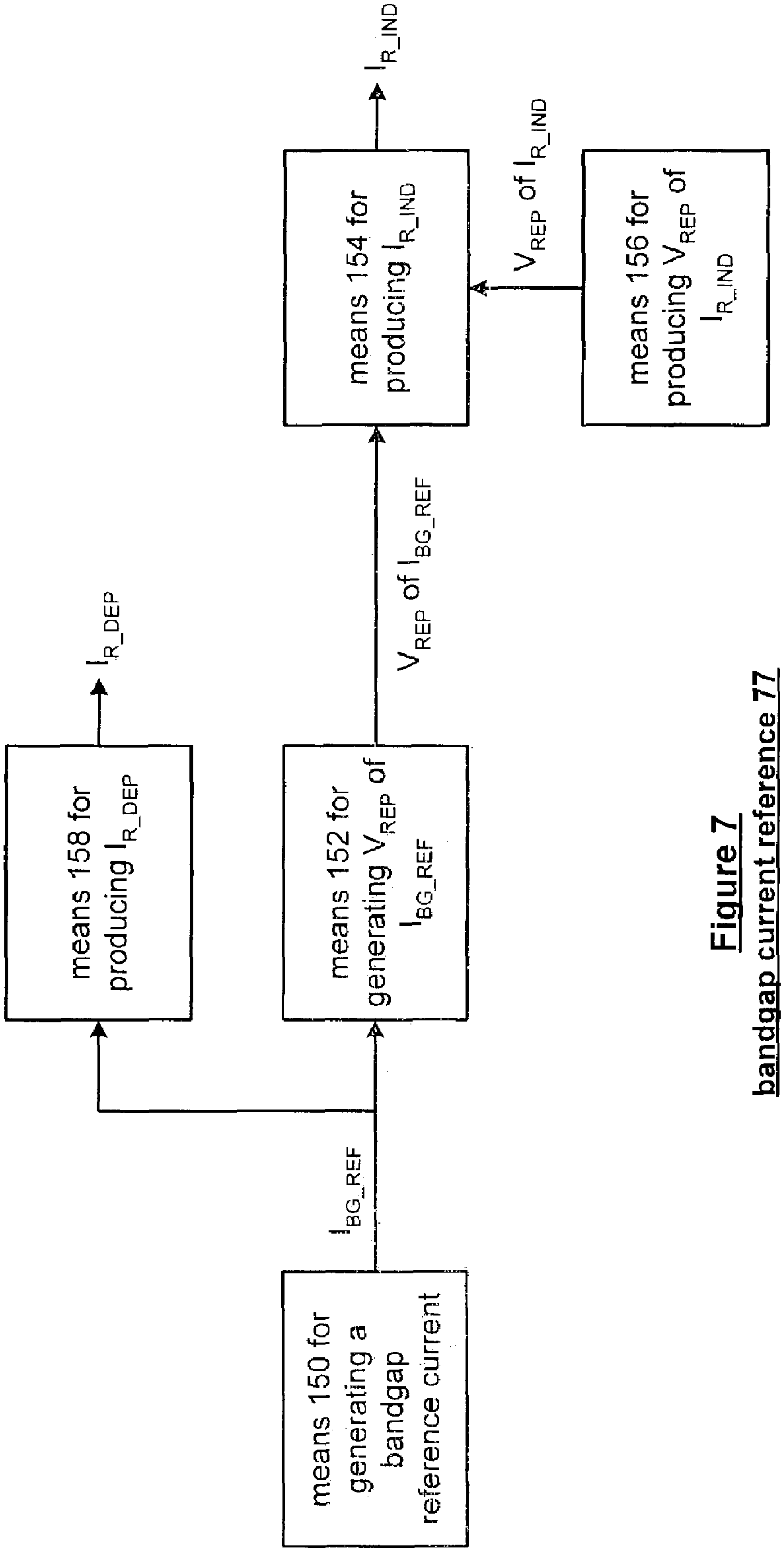
FIG. 7 is a schematic block diagram of an alternate embodiment of a band-gap current reference in accordance with the present invention.

FIG. 7 is a schematic block diagram of an alternate embodiment of the band-gap current reference module 77. The band-gap reference current module 77 includes means for generating a band-gap reference current, means for producing a process-dependent current source, means for generating a voltage representation of the band-gap reference current, means 154 for producing a process-independent reference current, and means 156 for producing a voltage representation of the process-independent current. The components to generate the corresponding process-independent reference current and the process-dependent reference current may be similar to those modules illustrated in FIGS. 3–6.

As one of average skill in the art will appreciate, the term “substantially” or “approximately”, as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term “operably coupled”, as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as “operably coupled”. As one of average skill in the art will further appreciate, the term “compares favorably”, as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a multi-mode band-gap current reference that produces a process-independent reference current and a process-dependent reference current. The process-independent band-gap reference current is a consistent value from integrated circuit to integrated circuit and overcomes process variations that are inherent in the fabrication of integrated circuits. Such process variations include capacitance value changes, resistance value changes, various gains of transistors, et cetera. As one of average skill in the art will appreciate, other embodiments may be derived from the teachings of the present invention without deviating from the scope of the claims.

What is claimed is:

1. A wireless communication device comprises:

a receiver section that includes:

a low noise amplifier operably coupled to amplify an inbound radio frequency (RF) signal to produce an amplified RF signal;

receiver mixing module operably coupled to mix the amplified RF signal with a receiver local oscillation to produce an inbound low intermediate frequency (IF) signal;

receiver filter module operably coupled to filter the inbound low IF signal to produce a filtered inbound low IF signal; and an analog to digital converter operably coupled to convert the filtered inbound low IF signal to produce a digital inbound low IF signal;

a transmitter section that includes:

a digital to analog converter operably coupled to convert an outbound digital low IF signal into an outbound analog low IF signal;

transmitter mixing module operably coupled to mix the outbound analog low IF signal with a transmitter local oscillation to produce an up-converted signal;

transmitter filter module operably coupled to filter the up-converted signal to produce a filtered up-converted signal; and a power amplifier operably coupled to amplify the filtered up-converted signal to produce a outbound RF signal, wherein at least one of the low noise amplifier, the receiver mixer module, the receiver filter, the analog to digital converter, the digital to analog converter, the transmitter mixing module, the transmitter filter module, and the power amplifier includes a bandgap reference current source that includes:

bandgap current mode module that provides a bandgap reference current and a voltage representation of the bandgap reference current; and an adjustable current source module operably coupled to produce a process independent bandgap current and a voltage representation of the process independent bandgap current, wherein the adjustable current source module produces the process independent bandgap current based on a difference between the voltage representation of the bandgap reference current and the voltage representation of the process independent bandgap current.

2. The wireless communication device of claim 1, wherein the multi-mode bandgap current reference further comprises:

a process dependent current source module operably coupled to produce a process dependent bandgap current based on the bandgap reference current.

3. The wireless communication device of claim 1, wherein the process dependent current source module further comprises a current mirror circuit.

4. The wireless communication device of claim 1, wherein the adjustable current source module further comprises:

a variable current source that produces the process independent bandgap current based on a control signal;

a resistor operably coupled to produce the voltage representation of the process independent bandgap current based on the process independent bandgap current;

comparator operably coupled to compare the voltage representation of the bandgap reference current with the voltage representation of the process independent bandgap current to produce the difference; and control module operably coupled to produce the control signal based on the difference.

5. The wireless communication device of claim 4, wherein the variable current source further comprises:

a plurality of transistors, wherein each of the plurality of transistors includes a gate, a drain and a source, wherein the drains of the plurality of transistors are coupled together and the sources of the plurality of transistors are coupled together, wherein the gates of each of the plurality of transistors is coupled to the control module to receive a corresponding bit of the control signal.

6. The wireless communication device of claim 4, wherein the variable current source further comprises:

a first transistor having a gate, a drain, and a source, wherein the first transistor is sized to mirror a fractional portion of the desired process independent bandgap current; and a plurality of gated transistors operably coupled in parallel to the first transistor based on the control signal, wherein a remaining portion of the desired process independent bandgap current is provided by the plurality of gated transistors enabled via the control signal.

7. A wireless communication device comprises:

a receiver section that includes:

a low noise amplifier operably coupled to amplify an inbound radio frequency (RF) signal to produce an amplified RF signal;

receiver mixing module operably coupled to mix the amplified RF signal with a receiver local oscillation to produce an inbound low intermediate frequency (IF) signal;

receiver filter module operably coupled to filter the inbound low IF signal to produce a filtered inbound low IF signal; and an analog to digital converter operably coupled to convert the filtered inbound low IF signal to produce a digital inbound low IF signal;

a transmitter section that includes:

a digital to analog converter operably coupled to convert an outbound digital low IF signal into an outbound analog low IF signal;

transmitter mixing module operably coupled to mix the outbound analog low IF signal with a transmitter local oscillation to produce an up-converted signal;

transmitter filter module operably coupled to filter the up-converted signal to produce a filtered up-converted signal; and a power amplifier operably coupled to amplify the filtered up-converted signal to produce a outbound RF signal, wherein at least one of the low noise amplifier, the receiver mixer module, the receiver filter, the analog to digital converter, the digital to analog converter, the transmitter mixing module, the transmitter filter module, and the power amplifier includes a bandgap reference current source that includes:

means for generating a bandgap reference current;

means for generating a voltage representation of the bandgap reference current based on the bandgap reference current;

means for producing a process independent bandgap current based on the voltage representation of the bandgap reference current and a voltage representation of the process independent bandgap current;

means for generating the voltage representation of the process independent bandgap current; and means for generating a process dependent bandgap current based on the bandgap reference current.

8. The wireless communication device of claim 7, wherein the means for generating a process dependent bandgap current further comprises a current mirror circuit.

9. The wireless communication device of claim 7, wherein the means for producing a process independent bandgap current further comprises:

a variable current source that produces the process independent bandgap current based on a control signal;

a resistor operably coupled to produce the voltage representation of the process independent bandgap current based on the process independent bandgap current;

comparator operably coupled to compare the voltage representation of the bandgap reference current with the voltage representation of the process independent bandgap current to produce the difference; and control module operably coupled to produce the control signal based on the difference.

10. The wireless communication device of claim 8, wherein the variable current source further comprises:

a plurality of transistors, wherein each of the plurality of transistors includes a gate, a drain and a source, wherein the drains of the plurality of transistors are coupled together and the sources of the plurality of transistors are coupled together, wherein the gates of each of the plurality of transistors is coupled to the control module to receive a corresponding bit of the control signal.

11. The wireless communication device of claim 8, wherein the variable current source further comprises:

a first transistor having a gate, a drain, and a source, wherein the first transistor is sized to mirror a fractional portion of the desired process independent bandgap current; and a plurality of gated transistors operably coupled in parallel to the first transistor based on the control signal, wherein a remaining portion of the desired process independent bandgap current is provided by the plurality of gated transistors enabled via the control signal.

* * * * *